United States Patent [19]
Victoria et al.

[11] Patent Number: 5,718,311
[45] Date of Patent: *Feb. 17, 1998

[54] COLD FORMED TORQUE CONVERTER COVER

[75] Inventors: Alfred Balacan Victoria, Warren; Joseph Anthony Szuba, Dearborn; Helmut Arnold Hardow Wodrich, Canton, all of Mich.

[73] Assignee: Ford Global Technologies, Inc., Dearborn, Mich.

[*] Notice: The term of this patent shall not extend beyond the expiration date of Pat. No. 5,515,955.

[21] Appl. No.: 626,087

[22] Filed: Apr. 1, 1996

[51] Int. Cl.$^6$ ............................................. F16H 45/02
[52] U.S. Cl. ............................... 192/3.28; 192/70.2
[58] Field of Search ........................... 192/3.29, 3.28, 192/3.3, 70.17, 70.2

[56] References Cited

U.S. PATENT DOCUMENTS

| | | |
|---|---|---|
| 2,920,728 | 1/1960 | Forster . |
| 3,915,272 | 10/1975 | Maurice . |
| 4,153,147 | 5/1979 | Chana . |
| 4,593,803 | 6/1986 | Valier . |
| 4,785,924 | 11/1988 | Jackel . |
| 4,821,855 | 4/1989 | Jackel . |
| 4,944,374 | 7/1990 | Casse et al. . |
| 4,945,782 | 8/1990 | Farrell . |
| 4,969,544 | 11/1990 | Fujimoto . |
| 5,211,270 | 5/1993 | Tamura et al. . |
| 5,384,949 | 1/1995 | Wodrich et al. . |
| 5,384,958 | 1/1995 | O'Daniel et al. . |
| 5,407,041 | 4/1995 | Fukunaga et al. . |
| 5,515,955 | 5/1996 | Victoria et al. . |

FOREIGN PATENT DOCUMENTS

| | | |
|---|---|---|
| 0 568 779 | 11/1993 | European Pat. Off. . |
| 39 32 823 | 12/1990 | Germany . |
| 39 31 599 | 2/1991 | Germany . |
| 58-193966 | 11/1983 | Japan . |
| 2 187 406 | 9/1987 | United Kingdom . |

OTHER PUBLICATIONS

Leifeld GmbH & Co. Werkzeugmaschinenbau "Chipless forming of internal tooth forms by the flow–forming process," Leico Technical Information.
Leifeld GmbH & Co. Werkzeugmaschinenbau "The status of spinning technology," first published in Germany, 1993.
Leifeld GmbH & Co. Werkzeugmaschinenbau, Leifeld Autospin, "Spinning and flow–forming . . .".
Leifeld GmbH & Co. Werkzeugmaschinenbau, "A new machine series of 2–Roller Flow Forming Machines".

*Primary Examiner*—Andrea L. Pitts
*Attorney, Agent, or Firm*—James J. Dottavio

[57] ABSTRACT

A lockup clutch assembly and fabrication method for a hydrokinetic torque converter having a clutch assembly located within the cover of the torque converter. The clutch assembly comprises a first friction disc drivably connected to the torque input member of a multiple ratio geared transmission and a second friction disc connected to the torque converter cover. The driving connection between the clutch and the cover is achieved by interlocking spline teeth which permit torque transfer through the clutch assembly while accommodating relative axial displacement therebetween. The cover includes a radial wall and a cold formed peripheral portion extending generally axially from said radial wall. The peripheral portion of the cover as formed has a surface with a substantially smooth circumference at an end distal from said radial wall.

5 Claims, 4 Drawing Sheets

5,718,311

COLD FORMED TORQUE CONVERTER COVER

TECHNICAL FIELD

The invention relates to hydrokinetic torque converters for use in automotive vehicle automatic transmissions and to improvements in the design and manufacture of a lockup clutch assembly for bypassing the hydrokinetic torque converter.

BACKGROUND OF THE INVENTION

In a hydrokinetic torque converter transmission for an engine driven automotive vehicle, the transmission may include a torque converter having a torque converter cover drivably connected to an impeller, the cover enclosing a turbine and a hydrokinetic reactor. The turbine and impeller have flow directing blades that create a torque flow path through the torque converter by controlling the direction of the torus fluid flow in the converter. The torque converter cover is connected to the engine and the turbine is connected to torque input elements of the transmission.

It is known design practice to establish a torque flow path through a lockup clutch assembly which bypasses the hydrokinetic torque flow path of the converter. The lockup clutch assembly comprises a friction surface on a torque converter cover and an axially movable piston assembly, the latter carrying a friction surface that engages the torque converter cover friction surface when a pressure differential is created across the lockup clutch assembly.

The torque transmitting capacity of the clutch can be increased by including within the clutch assembly an auxiliary friction disc between the piston assembly and the friction disc connected to the torque converter cover. An example of a high capacity clutch of this kind is shown in U.S. Pat. No. 4,821,855.

The auxiliary disc in the design of the '855 patent is carried by the torque converter cover, but relative axially shifting movement is permitted. The connection between the auxiliary disc and the torque converter cover is obtained by multiple brackets secured to the interior of the torque converter cover. The brackets drivably engage radially disposed bracket fingers or tabs carried by the auxiliary disc.

The mechanical driving connection established by the brackets and the bracket tabs causes impact problems due to the tangential gaps between the mating elements of the driving connection. This may result in fractured tabs. It also may result in undesirable brinelling and shear of the brackets. Further, excessive noise, vibration and harshness are problems that may be associated with a design of this kind since an undesirable degree of backlash, of necessity, will exist between the tabs and the brackets carried by the torque converter cover.

Manufacture of clutches of this kind creates fabrication problems because of the necessity for welding or otherwise securing the brackets to the interior of the torque converter cover. This requires special welding fixtures. Moreover, it is difficult using welding techniques to locate the brackets angularly with precision so that uniform loading of the brackets and the tabs is achieved. Tooling is also required to stamp the brackets.

Japanese Patent Publication No. 58-193966, dated Nov. 11, 1983, deals in part with the backlash problem in a conventional clutch construction wherein a single clutch disc surface of a torque converter clutch is adapted to engage a single friction surface on the torque converter cover. The damper plate for a clutch construction of this kind is connected to the clutch disc portion of the assembly through a pawl drive, which includes a spring plate located in a slot that receives a driving pawl. The spring plate eliminates or reduces backlash, but such a construction is not adaptable for a high capacity clutch of the kind used with the present invention.

U.S. Pat. No. 5,384,949 shows a method of manufacturing a clutch housing using a flow forming process. However, there is no teaching of flow forming a torque converter cover with internal splines, nor of flow forming a smooth outer surface for welded assembly of the cover to a female mated impeller housing, nor of thickening a torque converter cover at critical stress areas.

BRIEF DESCRIPTION OF THE INVENTION

The present invention comprises a high capacity multiple disc friction clutch assembly for a torque converter in an automotive vehicle driveline, wherein a friction disc is secured to the torque converter cover by a spline drive that does not require the use of welded brackets or spring-loaded tabs. It includes spline teeth or protrusions formed on the torque converter cover. Mating spline teeth are formed on the periphery of the auxiliary friction disc for the lockup clutch assembly.

Internal splines in the torque converter cover engage external splines on the friction disc assembly, thereby providing a robust torque transfer driving connection between the engine and the torque input element of the transmission when the clutch assembly is engaged, thus establishing a torque flow path that bypasses the hydrokinetic torque flow path of the torque converter. The internal splines on the torque converter cover are formed by a cold metal forming operation comprising flow forming the cover. Registering external spline teeth on the clutch assembly are precision formed, thereby providing precision engagement of the torque converter cover spline teeth or protrusions and the friction clutch teeth or projections. This eliminates backlash problems associated with prior art designs. It also eliminates the assembly problems associated with properly orienting the angular position of the clutch assembly with respect to the torque converter cover.

Impact loads of the cooperating spline teeth or protrusions are reduced because of the reduced backlash due to the precision tolerances that are achieved. The number of parts in the assembly is significantly reduced and the associated cost is lessened because of the elimination of the need for torque transmitting brackets and spring tabs. In addition, a heat treat process has been eliminated due to lower load distributions carried by each tooth on the spline. Stamping dies for forming the interlocking elements of the torque converter cover and the clutch assembly are not required since the manufacturing steps in forming the driving connection between the torque converter cover and the clutch disc assembly involve only cold metal forming using roller heads that exert pressure on the workpiece, rather than a high force extrusion press.

The cover is joined to the impeller housing at the open end of the cover. The flow forming process is capable of producing a substantially smooth exterior circumferential surface on the cover. The smooth surface may eliminate a machining operation of this surface which was required in prior art forming operations to facilitate the joining operation of the cover and impeller housing.

The flow forming process enables increased thickness of the cover at high stress areas, including the interface between the radial wall and the outer circumference of the cover. The external corner at this interface may thus have a smaller radius, thereby permitting the drive studs to be welded radially outboard on the cover. By so positioning the weld studs, weld distortion on the friction surface of the cover may be reduced or eliminated. The cover may also be thickened at the interface between the cover and impeller housing, thereby allowing more material for this interface or providing material for a machining operation if desired, plus may reduce welding distortion at the welded interface.

DESCRIPTION OF THE PREFERRED EMBODIMENTS

Figure 1:
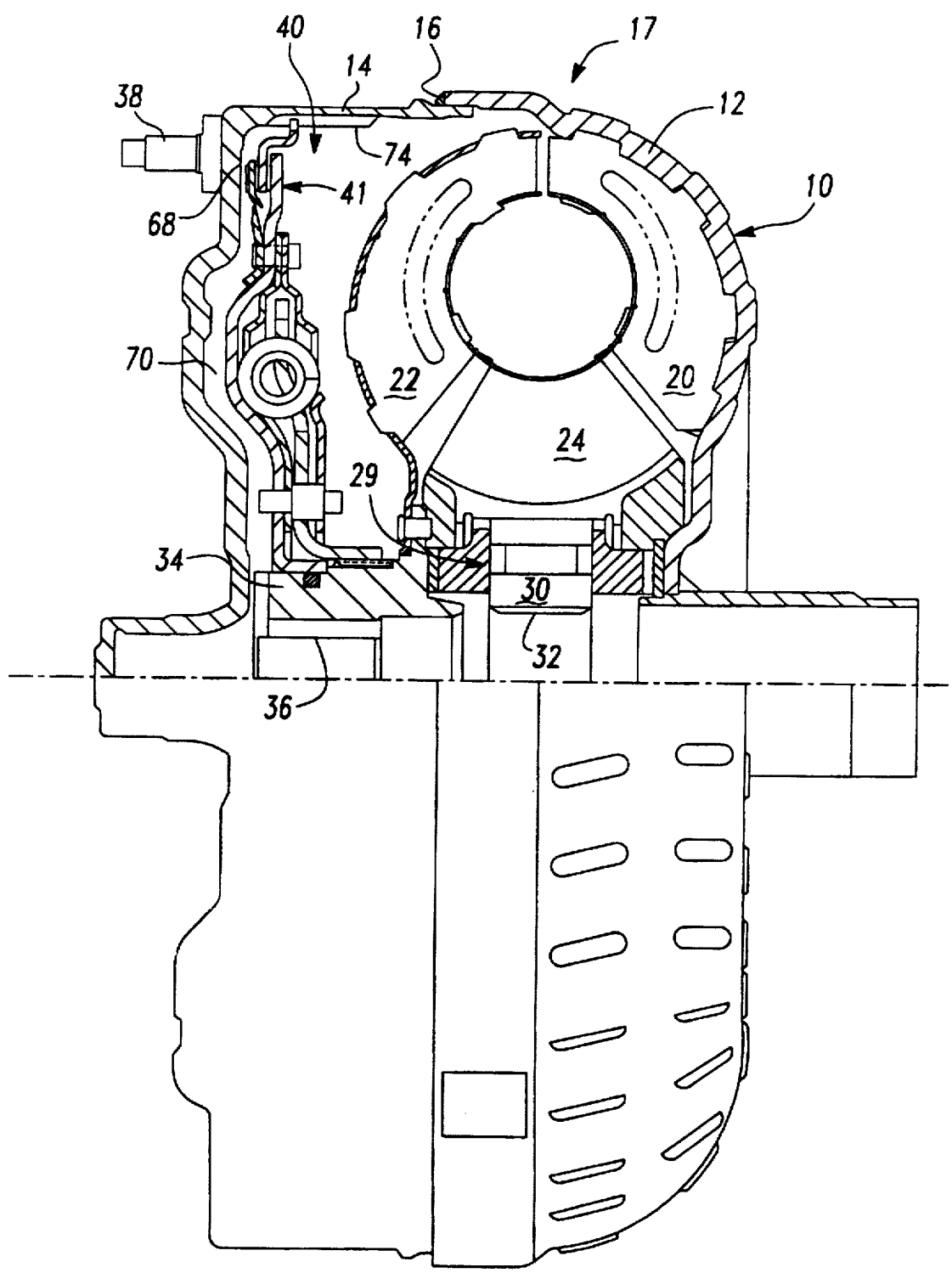
FIG. 1 is a partial cross-sectional view of a torque converter according to the present invention.

In FIG. 1, the impeller 10 of a hydrokinetic torque converter is generally shown. The impeller 10 includes a torus housing portion 12 and a drum-shaped cover portion 14 secured together by welding at 16 to form a closed torque converter assembly 17. A turbine 18 is situated in the impeller housing 12 in toroidal fluid flow relationship with respect to the impeller 10. Impeller blades 20 establish toroidal fluid out-flow passages that are in fluid communication with toroidal in-flow passages defined by turbine blades 22. Stator blades 24 are situated in the usual fashion between the flow exit section of the turbine blades 22 and the flow entrance section of the impeller blades 20.

Stator blades 24 are mounted on an overrunning clutch 29 having an inner race 30 splined at 32 to a stationary sleeve shaft (not shown). The overrunning clutch includes rollers, as shown, which establish a locking action to prevent rotation of the stator blades in one direction but permitting free wheeling motion in the opposite direction.

Turbine 18 includes a turbine hub 34 which has splines 36 to establish a driving connection with a torque input shaft (not shown) for a multiple ratio gear transmission.

The drum-shaped cover portion 14 is adapted to be connected by drive pins 38 to a drive plate (not shown), which is secured to the crankshaft of an internal combustion engine (not shown).

A cavity 40 is situated between the outer shell of the turbine 18 and the inner surface of the cover drum portion 14. The clutch assembly 41 is shown in this cavity in FIG. 1.

Figure 2:
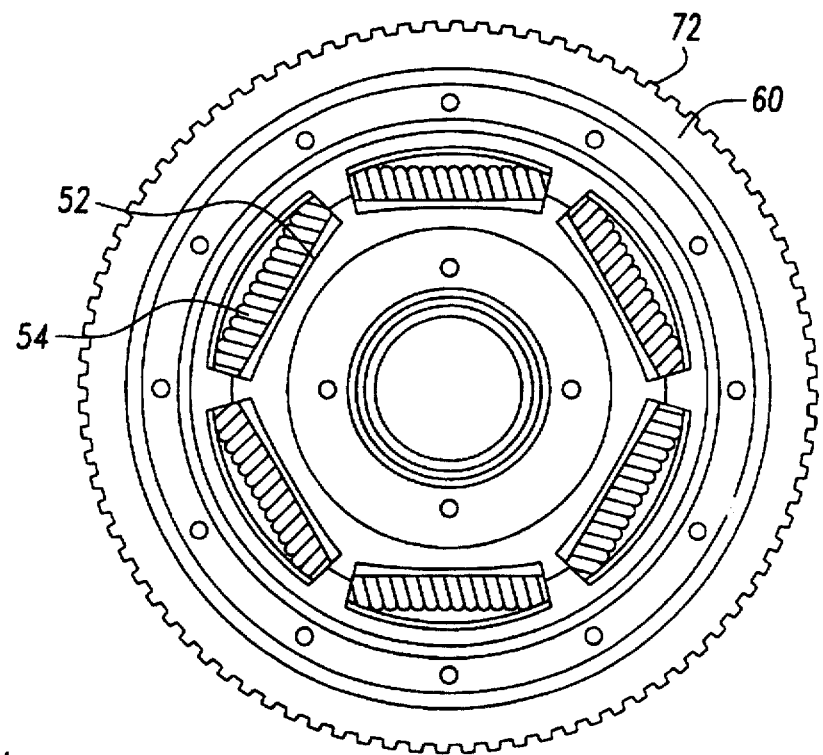
FIG. 2 is an end view of a piston assembly like that shown in FIG. 1.
Figure 3:
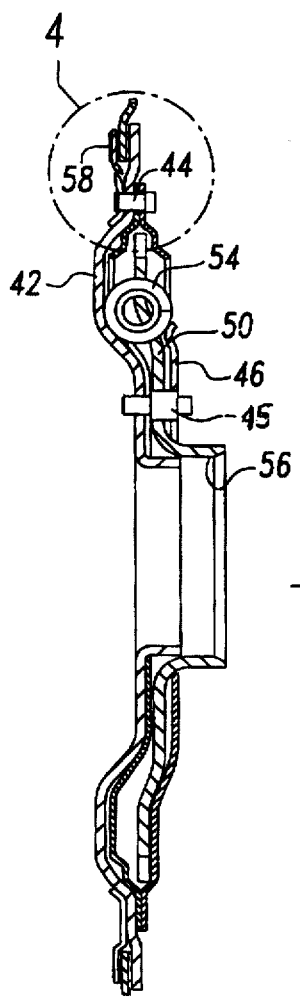
FIG. 3 ms a cross-sectional view of a piston assembly like that shown in FIG. 2.
Figure 4:
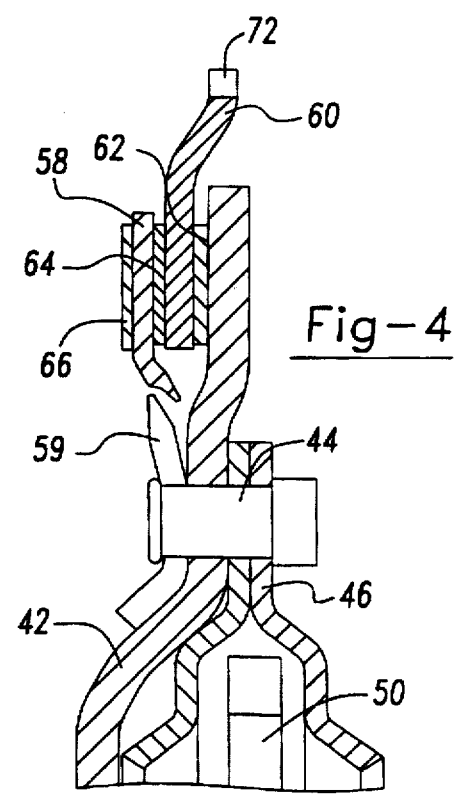
FIG. 4 is an enlarged view of the outer peripheral portion of the assembly of FIG. 2.

As seen in FIGS. 2 through 4, the clutch assembly includes a piston plate 42, which is adapted to be connected by rivets or drive pins 44 to clutch cover plate 46. The piston plate 42 is connected to spacer 48 which joins the piston plate 42 with cover plate 46. Situated between the piston plate 42 and cover plate 46 is a damper plate 50 formed with peripherally spaced spring pockets 52 which receive damper springs 54. These are positioned as shown in the cross-sectional view of FIG. 3. As seen in FIG. 3, springs 54 are seated on the peripherally spaced ends of the openings 52. When torque is applied to clutch plates 42 and 46, it is distributed through the springs to the damper plate 50, the latter being splined at 56 to the torque input shaft.

As shown in FIG. 3 and in the enlargement of FIG. 4A peripheral disc 58 is secured to the a retention plate 59 with tabs (not shown). The retention plate 59 is secured to the piston plate 42 with rivets 44. Situated between the peripheral disc 58 and piston plate 42 is a friction disc 60. Friction material 62 is located between friction disc 60 and piston plate 42, and friction material 64 is located between peripheral disc 58 and piston disc 60. The friction material 62 can be carried by either the piston disc 60 or plate 42. Similarly, friction material 64 can be carried by the disc 60 or the disc 58. Friction material 66 is carried by the disc 58 and is adapted to engage the friction clutch surface 68 formed in the interior of the cover drum 14, as seen in FIG. 1.

When the clutch assembly 41 is located within the torque converter cover, as shown in FIG. 1, a clutch release chamber 70 is formed between the drum 14 and the clutch assembly 41. When the pressure behind the turbine 18 exceeds the pressure in the release chamber 70, the clutch assembly 41 is energized, thereby establishing a torque flow path around the hydrokinetic unit whereby the crankshaft is connected directly to the torque input elements of the multiple ratio transmission. The mechanical torque flow path is established in part by spline teeth 72 formed in the disc 60, as seen in FIGS. 2 through 4. These spline teeth 72 engage internal spline teeth 74 formed in the interior of the torque converter cover drum 14, as seen in FIG. 1.

Figure 5:
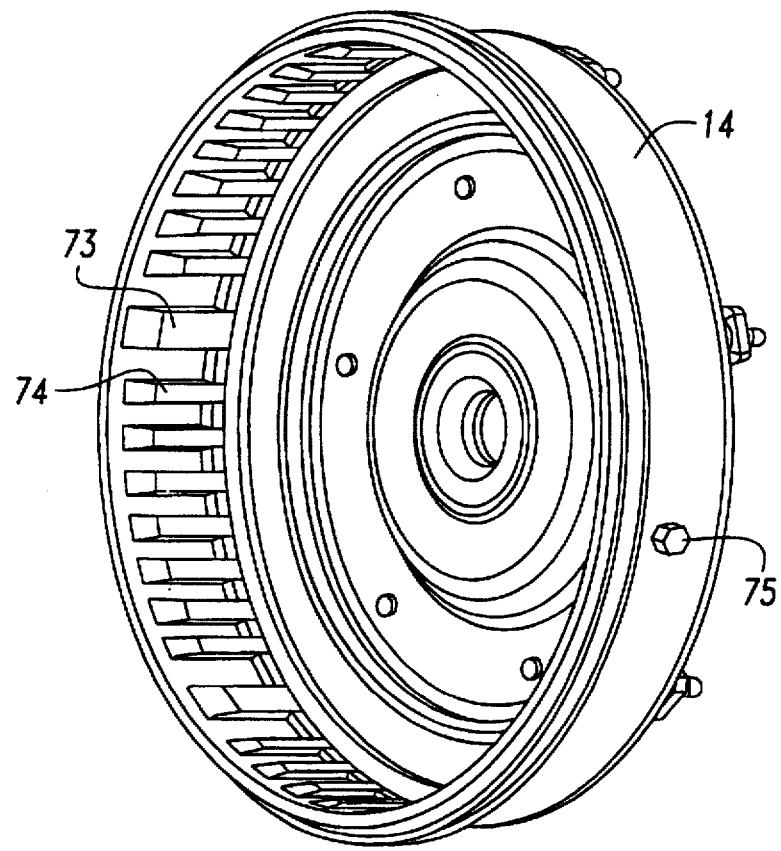
FIG. 5 is an isometric view showing the internal spline teeth of the torque converter cover.

As seen in FIG. 5, the internal teeth 74 in the drum 14 are spaced throughout the periphery of the drum. Teeth 74 register with the teeth 72 of the disc 60 to permit torque transfer from the drum 14 to the clutch assembly 41. Teeth 74 and 72 accommodate axial shifting movement of the clutch 41 with respect to the drum 14. In the preferred embodiment, at least one of the teeth 73 has a greater width than the other spline teeth 74 to accommodate an oil drain plug 75.

Figure 6:
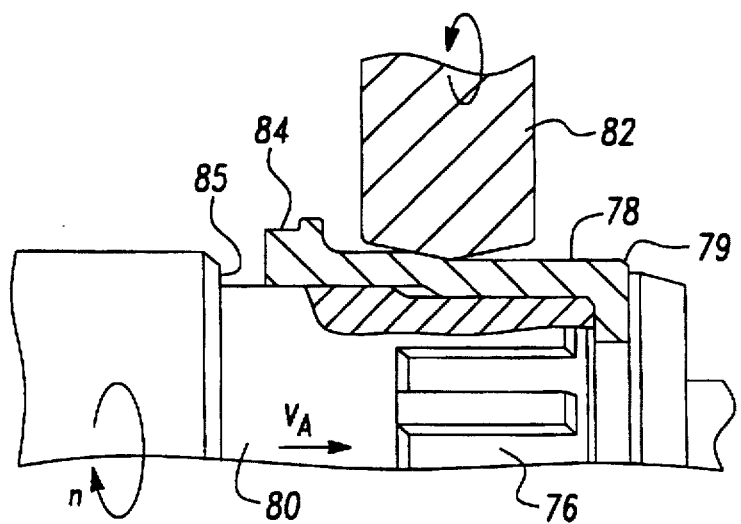
FIG. 6 is a partial cross-sectional view of a flow forming operation.
Figure 7:
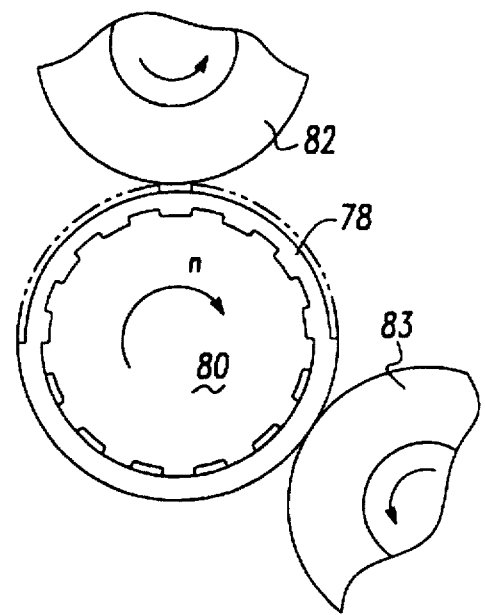
FIG. 7 is a partial end view of the flow forming operation shown in FIG. 6.

The spline teeth 74 are formed by a cold forming process using apparatus of the kind schematically illustrated in FIGS. 6 and 7. FIG. 6 shows in a flow forming device for forming internal spline teeth. The process involves placing a cup-shaped member 78 over mandrel 80 on which are formed external spline teeth. One or more rolls 82 contact the outer surface of the member 78, pressing the material into the recesses 76 of the splined outer surface of the mandrel 80. In the preferred embodiment, both the cup-shaped member 78 and the rolls 82 rotate. Additionally, the rolls 82 move axially along the length of the member 78, preferably through axial movement of the rolls 82, or through axial movement of the mandrel 80, while the rolls 82 are in contact with the member 78. The rolls 82 form a substantially smooth outer surface around the circumference of the member 78. The substantially smooth outer surface is nearly round without depressions or indentations around the circumference, thereby providing a surface for welding the housing 12 and cover 14.

The rolls 82 may be moved radially while traversing the length of the member 78, thereby varying the outside diameter of the member 78. Despite the potentially varying axial profile, the outer surface of the member 78 is substantially smooth circumferentially after flow forming as described above. Additionally, the mandrel 80 may have a plurality of outside diameters, thereby varying the inside diameter of the member 78 or the wall thickness thereof. In the preferred embodiment, the cover 14 is thicker at the open end 84; it is approximately 5 millimeters thick adjacent the splined portion 74 and thickens to approximately 7 millimeters at the open end 84. In the preferred embodiment, the mandrel has a shoulder 85 at the open end of the cover to stop the flow of the material at a desired point and permit thickening of the part at the open end 84.

The flow forming process also permits the thickness of the cover 14 to be increased at the intersection of the radial wall and axially extending portion of the cover 14, also known as the radius 79 of the closed end of the cover 14. This radius 79 is a point of higher stresses in prior art designs. The internal radius of the cover 14 at this interface is preferably about 5 mm or greater. In prior art designs, the outer radius equals the inner radius plus material thickness, or about 10 mm. In the preferred embodiment, the material is thickened at this radius 79 and therefore the outer radius is minimized, preferably to 4 mm or less. As the thickness of the part is increased at this radius 79 to approximately 9 mm, the stress is more evenly distributed over the profile of the cover. The relatively small radius 79 also permits the drive studs 38 to be located further outboard the axis of rotation, preferably beyond the friction surface 68 on the inner radial surface of the cover. Thus when the drive studs 38 are welded, the deformation of the cover at the friction surface 68 is minimized.

Another benefit gained by cold forming the cover during the flow forming process is an increase in hardness of the cover 14. The circumferential rolling action of the rollers 82 during the flow forming process also arranges the grains circumferentially around the cover 14. Each of these characteristics contributes to the increased strength of the cover 14 over prior art designs.

The smooth outer surface of the cover 14 is inserted into an impeller shell 12 as shown in FIG. 1 and the two pieces are welded together 16. The open end of the cover 14 has a continuous edge with no substantial indentations or cutouts. The continuous edge provides for sealing engagement with the impeller cover 12 when the cover 14 is inserted and welded to the impeller cover 12.

In prior art designs, the outer surface of the cover 14 had to be machined to prepare for welding to the impeller cover 12, but the flow forming process of the present invention produces a substantially smooth circumferential surface as formed which may eliminate the need for machining as described above. Furthermore, the orientation of the cover 14 and impeller cover 12 could be reversed for weldment if desired, because the flow forming process also may produce a smooth internal surface.

Figure 8:
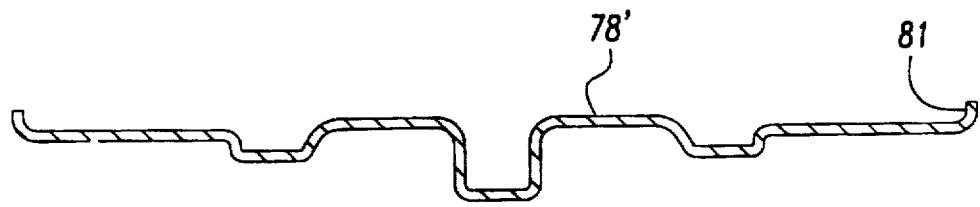
FIG. 8 is a cross sectional side view of a generally flat stamped plate prior to flow forming.

The starting workpiece for the cold forming of the cover 14 may be a cup-shaped blank 78 as shown in FIG. 6 and described above, a flat plate, or a generally flat plate 78', as shown in FIG. 8. It is preferred to stamp such a generally flat blank with a curled edge 81. The curled edge 81 prevents lapping of the material at the open end of the cover during the flow forming process.

Figure 9:
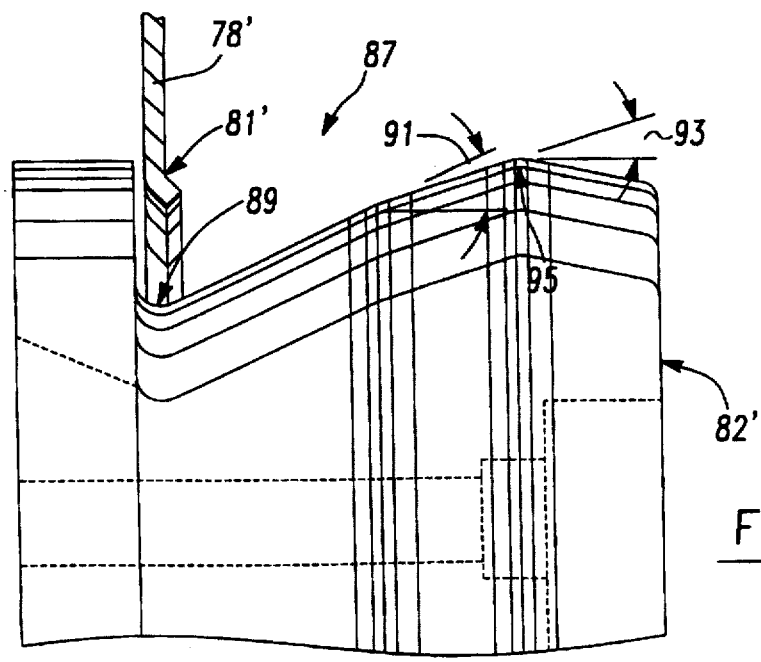
FIG. 9 is a partial side view of a roller usable in the flow forming operation of FIG. 6.

When a flat blank 78' is used, a first roller 82' as shown in FIG. 9 is used to form the part. The roller 82' has a concave surface 87, having an edge conditioning radius 89 which contacts the sheet 78' at the edge 81 of the sheet. In the preferred embodiment the sheet 78' has a thickness of approximately 5 mm and the radius 89 is approximately 10–20 mm. The roller 82' moves radially toward the sheet 78' and causes the material to bend as the roller 82' moves further into radial contact with the blank 78'. As the material is so bent by the roller 82', the edge conditioning back angle 91 forces the part to a generally cupped-shape. In the preferred embodiment, the back angle 91 is approximately 15–30 degrees. By varying the back angle 91 and radius 89, the thickening of the cover 14 at the radius 79 as described above may be controlled.

After the first roller 82' forms a generally cup-shaped part from the flat blank 78', a second roller surface traverses the cup-shaped part axially. The second roller surface may be formed on the first roller as shown in FIG. 9 at 95, or provided on a second roller. The second surface 95 is a conventional flow forming roller surface designed to form the outer periphery of a cylinder. In the preferred embodiment, the second surface 95 creates a substantially smooth outer surface while flowing the material into the mandrel to form internal splines and elongate the cover along the axis of rotation as described above for the cup shaped blank.

It is preferred to position one or more additional rollers 83 around the circumference of the cover during the flow forming process as shown in FIG. 7. The additional rollers 83 counteract the force provided by the forming roller described above and therefore help increase tool life and improve the consistency of the finished parts.

Prior art forming methods used to create cylindrical cold formed members include the Grob cold reduction process, as described in copending application Ser. No. 08/279,611, assigned to the assignee of the present invention. However, the impact from the forming heads of the Grob cold reduction process create indentations in the outer surface and therefore an irregular surface around the circumference of the part which require machining before mating the cover to the impeller housing. Additionally, the axial profile of the outer surface which may be formed using the Grob cold reduction process is more limited to shapes which the forming heads are capable of making. For example the thickening of the part produced in the present invention may not be achievable using the Grob cold reduction process.

One source for equipment for flow forming workpieces of the kind described in this specification is Leifeld GmbH & Co. of Germany, including models DW326 and FFC2T. A cold forming process adaptable for practicing the present invention is referred to in the industry as the Leico flow forming method.

Because of the precision that can be achieved using our improved cold forming techniques, reduced backlash can be achieved. This reduces impact loads on the engageable elements of the cover housing and the clutch assembly. Furthermore, orientation of the clutch assembly with respect to the impeller cover during assembly is greatly simplified, thereby reducing manufacturing costs and assembly time.

We have found that conventional high-strength, low-alloy steel can be used for the cover housing since it is adaptable for cold forming. Clearances between the spline teeth and the clutch assembly and the internal teeth of the torque converter cover can be maintained within limits of plus or minus 0.0002 inches. A high degree of repeatability can be achieved for high volume manufacturing operations.

Unlike the prior art devices that require welded brackets within the interior of the cover housing, our improved design eliminates misalignment problems during assembly. The controlled and reduced backlash reduces both impact loads on the spline teeth and improves the noise vibration and harshness of the transmission. Further, since the low-alloy steel of which the cover housing is formed grows axially during the cold forming operation, there is an additional cost benefit because of the reduced amount of steel and the elimination of waste due to finish machining compared to prior art designs.

It is understood that while the form of the invention herein shown and described constitutes the preferred embodiment of the invention, it is not intended to illustrate all possible forms thereof. It will also be understood that the words used are words of description rather than limitation, and that various changes may be made without departing from the spirit and scope of the invention as disclosed.

Having described preferred embodiments of our invention, what we claim and desire to secure by U.S. Letters Patent is:

1. A hydrokinetic torque converter and lockup clutch assembly comprising:

an impeller assembly having an impeller shell;

a torque converter cover mounted about a central axis, said cover adapted to be connected to a source of driving torque, said cover including a radial wall and a cold formed peripheral portion intersecting the radial wall and extending generally axially therefrom, said peripheral portion as formed having a surface with a substantially continuous edge and a substantially smooth circumference at a first end distal from said radial wall for inserted and welded engagement with the impeller shell, said cover having a first thickness prior to forming and a second thickness after forming at the intersection of the radial wall and the peripheral portion, wherein the second thickness is greater than the first thickness;

a turbine mounted on said axis in toroidal flow relationship with respect to said cover, said turbine adapted to be connected to a driven member;

a friction disc clutch enclosed in said cover between said turbine and said radial wall, said friction disc clutch having multiple friction discs in axially stacked relationship, at least one of said friction discs being connected to and being rotatable with said cover peripheral portion and the other friction discs of said friction disc clutch being adapted to be connected to said driven member; and a connection between said cover peripheral portion and said one friction disc comprising internal projections formed integrally in and extending radially inward from said peripheral portion of said cover, and external projections extending radially outward from said one friction disc, said internal and external projections being engageable thereby defining with said friction disc clutch a torque flow path between said cover and said driven member when said friction discs are engaged.

2. A hydrokinetic torque converter and lockup clutch assembly according to claim 1, further comprising said cover having a first thickness at the peripheral portion and a second thickness at the intersection of the radial wall and the peripheral portion, wherein the second thickness is greater than the first thickness.

3. The combination as set forth in claim 2, further comprising said peripheral portion of said cover as formed having a first thickness at the end distal from said radial wall and a second thickness closer to said radial wall having lesser dimension than said first thickness.

4. The combination as set forth in claim 2, wherein said internal projections are cold formed internal spline teeth and said external projections are external spline teeth.

5. The combination as set forth in claim 4, wherein said cover is produced using a flow forming process.

* * * * *